United States Patent [19]

Rosansky

[11] 3,897,270

[45] July 29, 1975

[54] BATTERY CONSTRUCTION WITH IMPROVED TERMINAL ATTACHING STRUCTURE

[75] Inventor: Martin G. Rosansky, Monsey, N.Y.

[73] Assignee: Power Conversion, Inc., Mount Vernon, N.Y.

[22] Filed: Feb. 26, 1974

[21] Appl. No.: 445,887

Related U.S. Application Data

[63] Continuation-in-part of Ser. No. 327,937, Jan. 30, 1973, abandoned.

[52] U.S. Cl. ................. 136/177; 136/133; 136/178
[51] Int. Cl.² ......................................... H01M 2/12
[58] Field of Search ............ 136/133, 177, 178, 135

[56] References Cited
UNITED STATES PATENTS

| | | | |
|---|---|---|---|
| 1,950,327 | 3/1934 | Punte | 136/178 |
| 2,179,816 | 11/1939 | Drummond | 136/133 |
| 3,143,441 | 8/1964 | Coleman et al. | 136/178 |
| 3,415,690 | 12/1968 | Richman | 136/178 |
| 3,676,221 | 6/1972 | Bach | 136/107 X |
| 3,706,617 | 12/1972 | Stark et al. | 136/178 |
| 3,809,580 | 5/1974 | Jugid | 136/133 |

Primary Examiner—Patrick P. Garvin
Assistant Examiner—John F. Niebling
Attorney, Agent, or Firm—Hopgood, Calimafde, Kalil, Blaustein & Lieberman

[57] ABSTRACT

A battery construction includes a casing which defines a cavity in which the electro-chemical contents of the battery is confined. A cover is disposed across an open end of the casing, and an aluminum interconnecting member is welded to the top of the cover. A cap, preferably made of steel, is fitted over an outwardly projecting portion of the cover to provide a terminal. A seam in the cover, closed by cold welding and epoxy is disposed beneath the outwardly projecting portion and the cap.

6 Claims, 5 Drawing Figures

PATENTED JUL 29 1975  3,897,270
SHEET 1
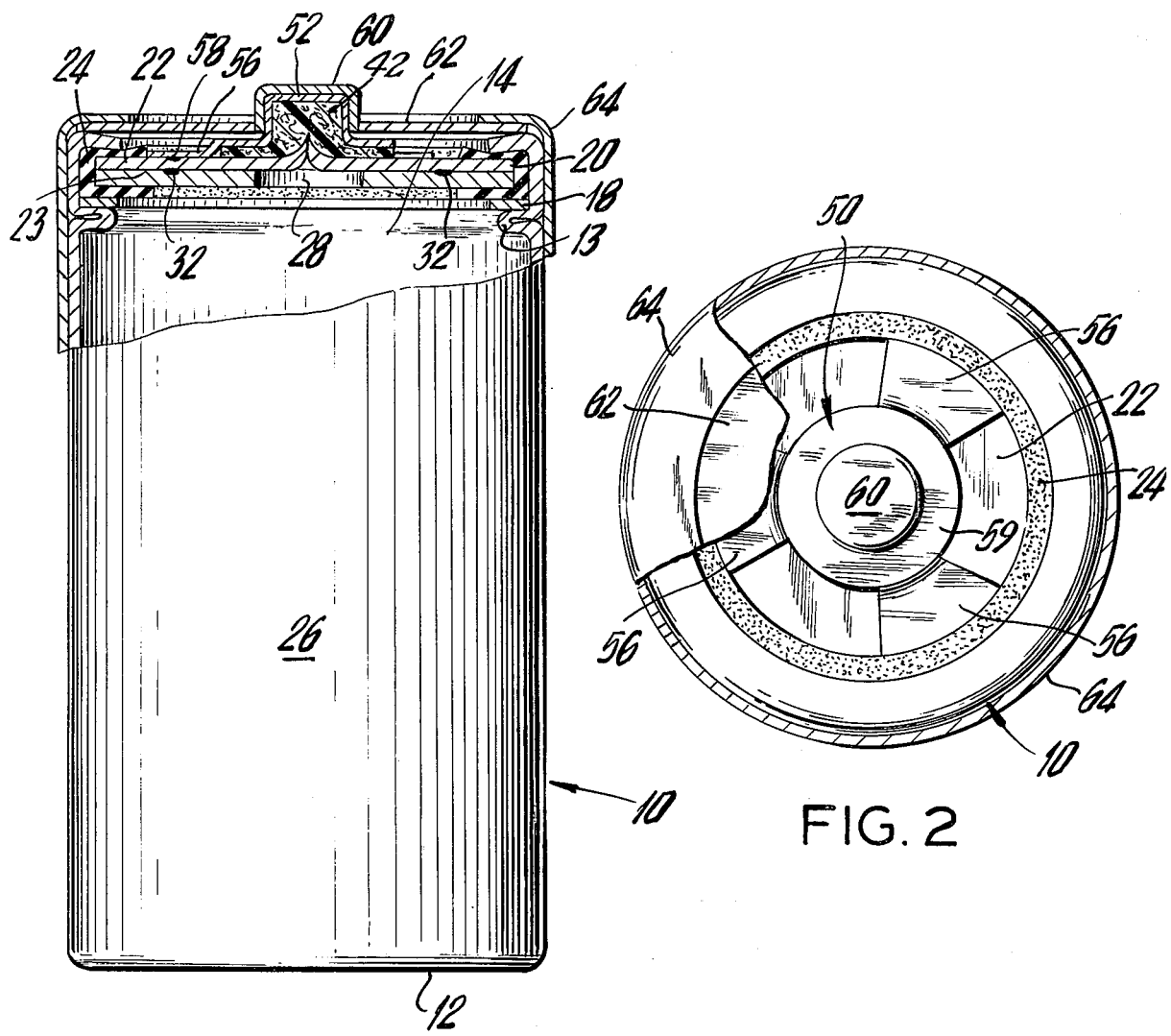
FIG. 1
FIG. 2
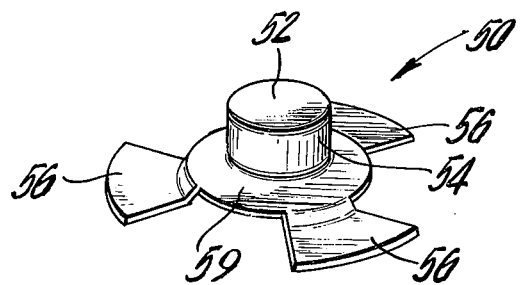
FIG. 3

BATTERY CONSTRUCTION WITH IMPROVED TERMINAL ATTACHING STRUCTURE

RELATED APPLICATIONS

This is a continuation-in-part of application Ser. No. 327,937 filed Jan. 30, 1973 now abandoned and entitled BATTERY CONSTRUCTION WITH PROVISION FOR VENTING ITS CONTENTS.

BACKGROUND OF THE INVENTION

This invention relates to a battery construction which includes an arrangement for attaching the terminal to the top of the battery.

The advent of high vapor pressure batteries that have greatly improved electrical output for their size and weight and extended shelf life has brought forth new problems in battery construction. These batteries generally utilize an electrically conductive top or cover sometimes made of aluminum. Exemplary batteries of the type referred to here utilize the element lithium and contain $SO_2$ as a depolarizer as described in U.S. Pat. No. 3,748,186 entitled METHOD FOR FILLING SEALED BATTERIES issued to Martin G. Rosansky et al. That patent is incorporated by reference herein.

The high vapor pressure electrolyte of batteries of the type referred to it usually injected through an eyelet integrally formed in the aluminum cover of the battery casing. After the injection step, the upstanding portion of the eylet is cut off and the remaining stub is closed by cold welding. A cap that forms a terminal is then added. It is preferable that this cap be made of steel so that connections can be readily welded to it and that the cold welded seam be covered with epoxy to insure that no leaks will develop.

The attachment of the cap presents difficult problems especially in view of the long shelf life expected. A pressure contact between the cap and the flat surface of the cover does not provide a satisfactory electrical connection of long life because welding steel to aluminum is difficult and the epoxy applied in the area of the weld tends to interfere. A possible galvanic reaction between the steel and the aluminum may lead to additional problems.

Ideally a solution to the problem of affixing the cap to the cover should be compatible with the other preferred construction features. A preferred construction includes a rigid partition extending across an opening at one end of the casing with a bendable cover overlying the partition. A passageway is provided to apply the internal pressure of the battery to the cover which is bent away from the partition to vent its contents at a predetermined pressure. A good seal about the periphery of the cover and partition is provided by a thrust ring located below the partition.

Accordingly, there is presently a need for a new type of battery construction which is compatible with high vapor pressure, long storage life and facilitates the attachment of a terminal fabricated from a desirable material.

SUMMARY OF THE INVENTION

According to this invention, a battery comprises a casing defining a cavity in which the high vapor pressure electrochemical system of the battery is confined. In the preferred embodiment, a rigid partition is disposed across an opening in the casing, and a relatively bendable cover is disposed with its under surface overlying the partition to facilitate venting and prevent explosions in a manner explained below. The cover includes a seam closed by cold welding which is protected by a coating of epoxy resin. An aluminum interconnecting member is welded to the cover and has an outwardly projecting portion defining one or more upstanding side walls that cover the seam. A cap, preferably made of nickel plated steel, is fitted over the outwardly projecting portion and engages the side walls thereof to form an electrical terminal.

BRIEF DESCRIPTION OF THE DRAWINGS

An understanding of additional aspects of the invention can be gained from a consideration of the following detailed description of representative embodiments taken, in conjunction with the appended drawings wherein:

FIG. 1 is a cross-sectional view of a battery constructed in accordance with the invention;

FIG. 2 is a top view of the battery shown in FIG. 1 with the plastic covering and disc removed;

FIG. 3 is a pictorial view of an interconnecting member included in the battery of FIG. 1;

DESCRIPTION OF THE PREFERRED EMBODIMENT

Figure 4:
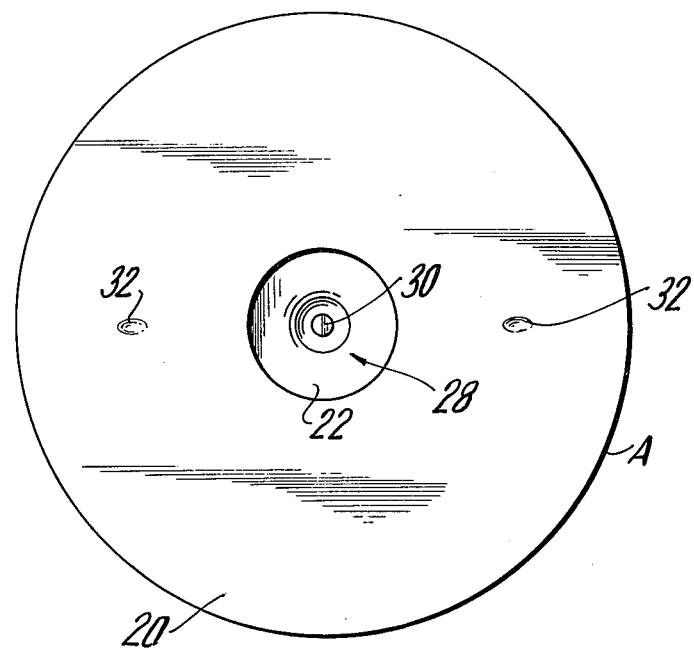
FIG. 4 is a bottom view of a top portion of the battery of FIG. 1.

A battery construction designed in accordance with the concept of this invention is shown in FIG. 1. It includes a cylindrical steel battery casing 10 which is closed at its bottom end 12. The casing 10 is necked about its perimeter to form a ridge 13 along the interior of the casing slightly spaced from its opened top end 14. A rigid annual metallic thrust ring 18 is inserted from the open end 14 of the casing 10 and seated against this ridge 13.

Disposed across the open end 14 of the casing 10 is a rigid, aluminum, disc-shaped partition 20. A discshaped aluminum cover 22 of the same size is positioned with its under surface 23 overlying the rigid partition 20. The perimeter of the partition 20 and cover 22 is surrounded and engaged by an annual elastomeric insulator or sealing member 24 which is pressed upwardly by the thrust ring 18 and downwardly by a crimped edge 25 formed by the inwardly bent perimeter of the open end 14 of the casing 10. This construction normally seals a cavity 26 within the casing 10 wherein the electro-chemical system of the battery is confined.

A bottom view of the partition 20 is shown in FIG. 4. The partition includes a centrally located aperture 28 which is aligned with a seam 30 in the cover 22 which has been closed by cold welding. The cover 22 is securely attached to the partition 20 by two diametrically opposed spot welds 32. While the partition 20 is rigid, the cover 22 is more readily bendable. Any internal pressure within the cavity 26 is applied against the under surface 23 of the cover 22 because that surface 23 is in communication with the cavity 26 through the passageway formed by the aperture 28. If this internal pressure exceeds a predetermined limit, the bendable cover 22 will be deformed so that it pulls away from the crimped upper edge 25 of the casing 10 near the point A on its periphery most distant from the welds 32. Alternatively, the cover may deform and tear near the weld. Thus, the deformation will allow the contents to escape and release the pressure while the cover 22 remains safely and securely attached to the partition 20, thus eliminating the danger from flying projectiles which would otherwise be associated with the release of the internal pressure.

Figure 5:
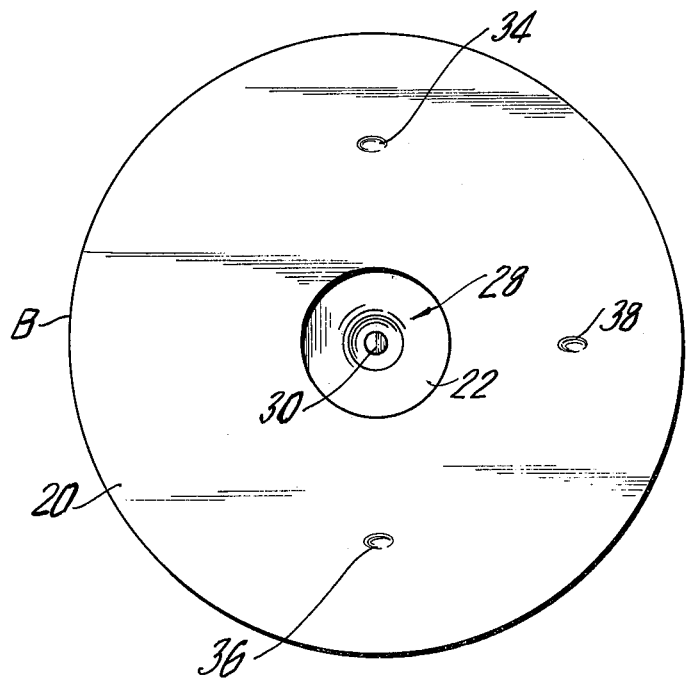
FIG. 5 is a modification of the construction shown in FIG. 4.

The specific configuration of the partition 20 depicted in FIG. 2 is shown here only by way of example. It is advantageous because the pressure limit by which the battery vents can be selected by properly positioning the welds 32. If the battery is intended to vent at a relatively high pressure, the welds 32 are positioned relatively close to the center of the battery, whereas, if the battery is intended to vent a relatively low pressure, the welds 32 will be moved farther apart toward the periphery of the partition 20. There are, however, many other desirable configurations. One shown here, by way of example, in FIG. 5 includes three spot welds 34, 36, and 38, two of which (34, 36) are diametrically opposed, with the third 38, located 90° from each of the first two. Diametrically opposed to the third weld 38 is a point B on the periphery of the partition 20 which is most distant from the spot welds 34. It is near this point B that a release of internal pressure will most likely occur by deformation of the cover 22, if the selected upper pressure limit is exceeded.

The seam 30 in the cover 22 results from an upstanding eyelet through which the electrolyte solution of the battery is injected. After the battery is filled, this eyelet is pinched-off leaving a stub 40 which is selected by cold welding. To insure against the development of leaks in the seam 30, a liberal coating 42 of epoxy resin is applied thereto.

An aluminum interconnecting member, shown in FIG. 3, is attached to the outer surface of the cover 22. In this preferred embodiment, the interconnecting member 50 includes an outwardly projecting portion 52 which has an upstanding cylindrical sidewall 54.

The interconnecting member 50 also includes three radially extending arms 56 and a circular platform 58 raised above the outer surface of the cover 22 by which the arms 56 are connected to the outwardly projecting portion 52. Each of the arms 56 is spot welded to the cover 22. Since the cover 22 and the interconnecting member 50 are both made of aluminum, a secure weld that will not deteriorate is readily accomplished. The spacing between the welds 58 and the seam 30 and the area between the cover 22 and the raised platform 59 insures that the epoxy resin 42 will not interfere with the welds 58.

A cylindrical steel cap 60 which is closed at one end is force-fit over the projecting portion 52 of the interconnecting member 50 so that it engages the upstanding sidewalls thereof. A threaded or snap-on construction may be used. Additionally, it may also be welded. Although it is difficult to accomplish a good weld here because different metals are involved, the weld is supplemented and made easier by the mutually engaging configuration of the pieces 50 and 60. The cap 60 serves as an electrical battery terminal.

A plastic disc 62 is placed over the interconnecting member 50 with the outwardly projecting portion 52 protruding through a centrally located opening therein. Then the casing 10 is wrapped with a plastic outer covering 64 which has an inwardly projecting end portion that secures the disc 62 about its outer periphery. The disc 62 and recovering 64 have both protective and cosmetic functions. In FIG. 2, the disc 62 and the plastic covering 64 are omitted.

Although the invention has been described above with reference to specific embodiments, many modifications and variations therein will readily occur to those skilled in the art. All such modifications and variations are intended to be included within the scope of the present invention.

I claim:

1. A battery comprising a casing defining a cavity, and having an open end, a high vapor pressure electrochemical system confined within said cavity, a partition disposed across said open end, an aluminum cover also disposed across said open end and spot welded to said partitions, and outwardly protruding cold welded seam formed on said cover, an epoxy resin coating said seam, an aluminum interconnecting member welded to said cover at a plurality of locations spaced from said seam and having an upstanding portion that covers said seam and includes one or more upstanding sidewalls, and a cap fitted over said upstanding portion and engaging the sidewalls thereof to form an electrical terminal, whereby said cover is peripherally deformed at a point most distant from said spot weld to release pressure in the event that a predetermined upper pressure limit is reached, or alternatively, said cover is peripherally deformed and said/spot weld is ruptured.

2. The battery of claim 1, wherein said cap is at least partially made of steel.

3. The battery of claim 1, wherein said aluminum interconnecting member further includes a plurality of radially extending arms each of which is welded to said cover.

4. The battery of claim 1, wherein said aluminum interconnecting member includes a plurality of radially extending arms by which it is welded to said cover and a platform raised above the outer surface of the cover which connects the arms to the upstanding portion.

5. A battery comprising a cylindrical casing closed at one end and open at the opposite end which defines a cavity, a high vapor pressure electro-chemical current producing system confined within the casing, a ridge about the interior of the casing formed by as necked portion thereof spaced from the open end of the casing, a rigid annual thrust ring seated against said ridge, an unsulating member disposed within the casing and against one surface of said thrust ring, a crimped portion of the battery casing bent inwardly against the insulating member, a disc-shaped rigid partition disposed across the open end of said casing and engaged about its periphery by the insulating member, a bendable metal cover disposed with its under surface overlying the partition and having an outwardly projecting seam closed by cold welding formed therein, an epoxy resin coating said seam, at least one spot weld attaching said cover to said partition, at least one aperture defined by the partition whereby the under surface of the cover communicates with the cavity and any internal pressure generated by the electo-chemical system is applied against the under surface of said cover whereby said cover is peripherally deformed at a point most distant from the spot weld to release pressure in the event that a predetermined upper pressure limit is reached alternatively, said cover is peripherally deformed and said spot weld is ruptured, an aluminum interconnecting member cold welded to said cover including an upstanding portion that covers said seam and includes one or more upwardly projecting sidewalls, and a cap made of a material different from that of the interconnecting member fitted over said upstanding portion and engaging the sidewalls thereof to form an electrical terminal.

6. The battery of claim 5, wherein said cap is made of steel.

* * * * *

UNITED STATES PATENT OFFICE
CERTIFICATE OF CORRECTION

Patent No. 3,897,270　　　　　　　　　　Dated July 29, 1975

Inventor(s) Martin G. Rosansky

It is certified that error appears in the above-identified patent and that said Letters Patent are hereby corrected as shown below:

Claim 5, column 4, line 44, "as necked" should be --a necked--;

line 47, "unsulating" should be --insulating--;

line 60, "electo-chemical" should be --electro-chemical--;

line 64, after "reached" insert --or--.

Signed and Sealed this eleventh Day of November 1975

[SEAL]

Attest:

RUTH C. MASON
Attesting Officer

C. MARSHALL DANN
Commissioner of Patents and Trademarks